(12) United States Patent
Ebata

(10) Patent No.: US 10,382,771 B2
(45) Date of Patent: Aug. 13, 2019

(54) IMAGE PROCESSING APPARATUS

(71) Applicant: CANON KABUSHIKI KAISHA, Tokyo (JP)

(72) Inventor: Yuya Ebata, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 170 days.

(21) Appl. No.: 15/470,077

(22) Filed: Mar. 27, 2017

(65) Prior Publication Data
US 2017/0289560 A1 Oct. 5, 2017

(30) Foreign Application Priority Data

Apr. 4, 2016 (JP) .................. 2016-075423

(51) Int. Cl.
H04N 19/44 (2014.01)
H04N 19/167 (2014.01)
H04N 19/65 (2014.01)
H04N 19/423 (2014.01)

(52) U.S. Cl.
CPC ........... H04N 19/44 (2014.11); H04N 19/167 (2014.11); H04N 19/423 (2014.11); H04N 19/65 (2014.11)

(58) Field of Classification Search
CPC .... H04N 19/167; H04N 19/423; H04N 19/44; H04N 19/65

USPC .................................. 375/240.01–240.29
See application file for complete search history.

(56) References Cited

U.S. PATENT DOCUMENTS

2015/0163370 A1* 6/2015 Suzuki ................ H04N 1/2129
348/231.99
2017/0243323 A1* 8/2017 Croxford ............ H04N 13/106

FOREIGN PATENT DOCUMENTS

JP 2011-043658 3/2011

* cited by examiner

Primary Examiner — Farzana Hossain
(74) Attorney, Agent, or Firm — Venable LLP

(57) ABSTRACT

An image processing apparatus has a plurality of image processing circuits, each having a local memory, an image processing unit, and a communication unit communicating with other image processing circuits. A first image processing circuit among the plurality of image processing circuits has a decoder which decodes encoded RAW moving image data to store the decoded RAW moving image data in the local memory, a determiner which determines areas out of the obtained frame that the plurality of image processing circuits respectively process, and a transmitter which transmits RAW image data of the determined areas to other image processing circuit. The determiner sets the size of the area in the frame that the first image processing circuit processes to be smaller than the size of area that the other image processing circuit processes.

13 Claims, 6 Drawing Sheets

IMAGE PROCESSING APPARATUS

BACKGROUND OF THE INVENTION

Field of the Invention

The present invention relates to an image processing technique for encoded RAW moving image data.

Description of the Related Art

In recent years, in an image processing apparatus such as a digital camera, a number of pixels of an image capture device has been increasing, and a frame rate of a handled moving image has also been increasing. Therefore, a data amount processed in the image processing apparatus is increasing. Accordingly, Japanese Patent Laid-Open No. 2011-43658 (hereinafter may be referred to simply as document) proposes a configuration in which image processing is divided and performed by a plurality of image processors. Specifically, this is where a plurality of image processors are connected to one another, areas of an image are divided left and right, and each image processor performs divided processing on a divided area.

In a case of performing processing by an image processor, it is typical to perform the processing while accessing a memory. However, in a technique disclosed in this document, the left and right images processed by the two image processors are collected at one of the image processors to finally make one image before it is displayed. Therefore, a memory bus bandwidth for each image processor is not equal, and there is the possibility that processing of one of the image processors is not in time and there is a dropped frame in a reproduction display, or a frame originally to be displayed cannot be displayed and an immediately prior frame is displayed.

SUMMARY OF THE INVENTION

The present invention was conceived in view of the above described problem. The present invention provided a technique for suppressing image loss, when implementing reproduction of encoded RAW moving image data by a plurality of image processing circuits in particular, caused by a deficiency of a memory access bandwidth of one of the image processing circuits.

According to an aspect of the invention, there is provided an image processing apparatus comprising: a plurality of image processing circuits; and a plurality of memories respectively connected to the plurality of image processing circuits, wherein each of the plurality of image processing circuits has an image processing unit configured to perform image processing that includes development processing of RAW moving image data using a memory connected to each image processing circuit, and a communication unit, wherein a first image processing circuit that is one of the plurality of image processing circuits has a decoding unit configured to decode encoded RAW moving image data and store the decoded RAW moving image data in a memory connected to the first image processing circuit, a determination unit configured to determine, so that the plurality of image processing circuits respectively process partial areas in one frame of the RAW moving image data decoded by the decoding unit, areas to be processed by the respective image processing circuits, and a transmission unit configured to transmit RAW moving image data of the determined area to be processed by at least one image processing circuit other than the first image processing circuit to the at least one other image processing circuit by the communication unit of the first image processing circuit, wherein the determination unit sets the size of an area in the one frame to be processed by the first image processing circuit smaller than the size of the area to be processed by at least one other image processing circuit, and wherein the image processing unit in the first image processing circuit processes the RAW moving image data of the area determined as the area to be processed by the first image processing circuit.

By virtue of the present invention, in a case of reproducing an encoded RAW moving image data image by a plurality of image processing circuits, reproduction of a normal moving image is possible by suppressing generation of an image processing circuit that has a memory bandwidth deficiency.

Further features of the present invention will become apparent from the following description of exemplary embodiments (with reference to the attached drawings).

DESCRIPTION OF THE EMBODIMENTS

Hereinafter, embodiments according to the present invention will be explained in detail in accordance with the accompanying drawings. Note that an image processing apparatus in the embodiments is explained as a portion of an imaging apparatus. The imaging apparatus is explained as a digital camera, but an imaging apparatus such as a digital video camera, a smart phone, a cellular phone with a camera, or an in-vehicle camera can be employed. For an image processing apparatus in the embodiments, explanation is given of an example in which encoded RAW moving image data that is recorded on a recording medium is read and subject to reproduction display. Explanation is given for an example in which an image processing apparatus has a plurality of image processing circuits, and each image processing circuit is responsible for a portion of processing of a moving image frame.

First Embodiment

Figure 1:
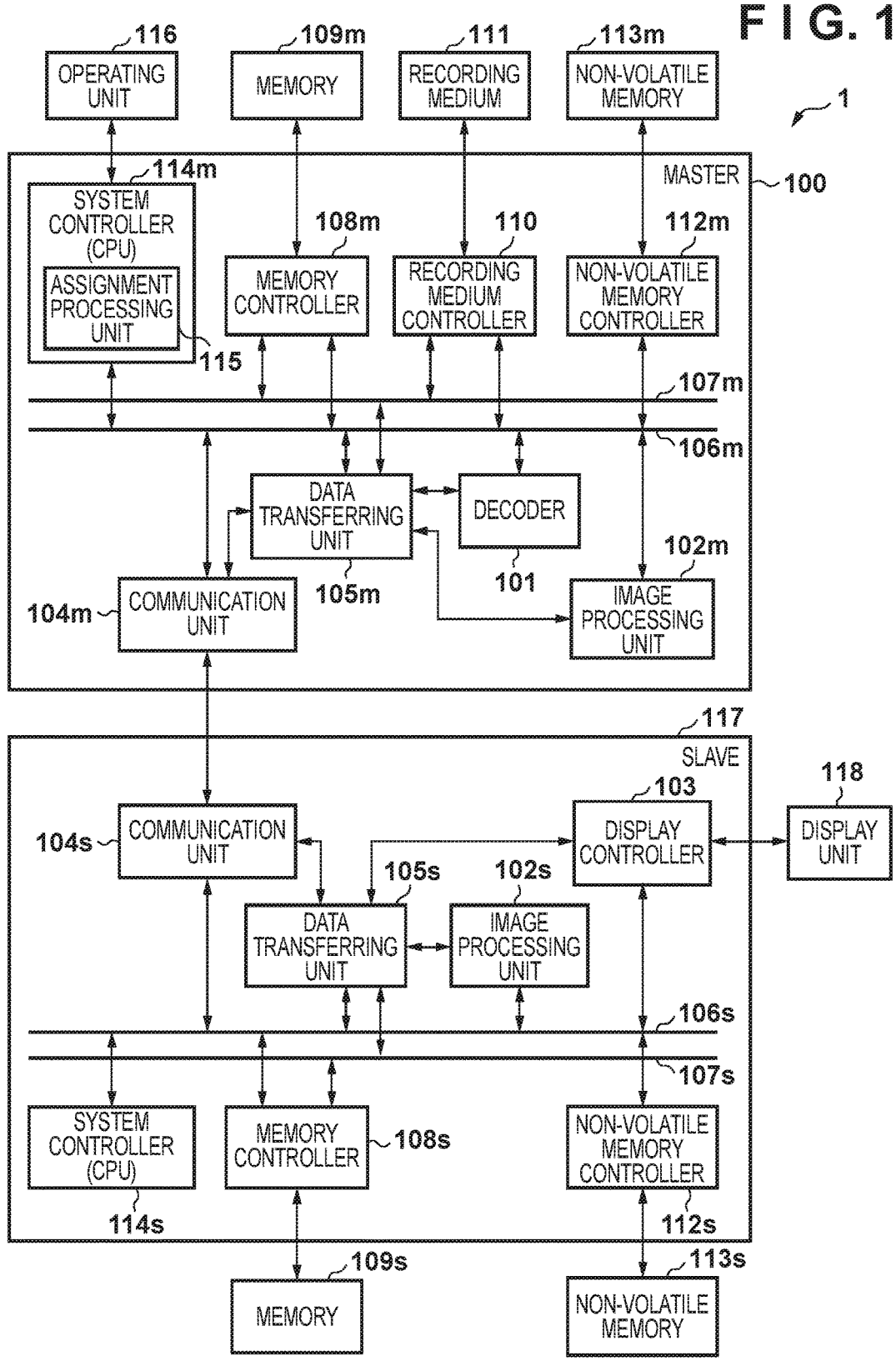
FIG. 1 is a block configuration diagram of an image processing apparatus in an image capturing apparatus in a first embodiment.

FIG. 1 is a block diagram illustrating an example of a configuration of an image processing apparatus according to a first embodiment. An image processing apparatus in the embodiments is provided with two image processing circuits 100 and 117 that are capable of independent operation. The image processing circuit 100 functions as a master circuit, and the image processing circuit 117 functions as a slave circuit. Note that the same reference numeral is added to configuration elements that are common for the image processing circuits 100 and 117. However, the suffix "m" is added to reference numerals of the configuration elements of the image processing circuit 100 that functions as the master, and the suffix "s" is added to reference numerals of the configuration elements of the image processing circuit 117 that functions as the slave.

The image processing circuit 100 that functions as the master has a decoder 101, an image processing unit 102m, a communication unit 104m, a data transferring unit 105m, a memory controller 108m, a recording medium controller 110, a non-volatile memory controller 112m, and a system controller 114m. In addition, the image processing circuit 100 has a data bus 107m and a system bus 106m for connecting each unit.

In addition, the image processing circuit 117 that functions as the slave has an image processing unit 102s, a display controller 103, a communication unit 104s, a data transferring unit 105s, a memory controller 108s, a non-volatile memory controller 112s, and a system controller 114s. The image processing circuit 117 has a data bus 107s and a system bus 106s for connecting each unit.

In addition, each unit of the image processing circuit 100 is implemented on one semiconductor integrated circuit (IC) chip. Similarly, each block of the image processing circuit 117 is implemented on one integrated circuit (IC) chip. Note that the image processing circuit 100 and the image processing circuit 117 may be realized by exactly the same chip. Furthermore, the image processing circuits 100 and 117 may have an AD converter for converting an analog signal from an image capture device (not shown) to a digital signal, or image capture processing units for performing processing such as pixel correction, black level correction, shading correction, and defective pixel correction. In addition, the image processing circuits 100 and 117 may have an encoding unit for encoding image data in accordance with a publicly known compression scheme.

Firstly, explanation is given for each configuration element of the image processing circuit 100 and the function thereof.

The decoder 101 performs processing to decompress (decode) encoded RAW moving image data read from a recording medium 111, and generates each frame of the decoded RAW moving image data (RAW image frame data). Encoded RAW image frame data is encoded data that, in accordance with a predetermined encoding method, each piece of color component data from an R, G, B Bayer array outputted from an image capture device has been encoded without being subject to development processing. Such encoded RAW moving image data is recorded in the recording medium 111. The number of pixels of one frame of decoded RAW moving image data is 1920 horizontal pixels× 1080 vertical pixels, and a frame rate is 60 frames per second (fps). In addition, configuration may be taken to set the number of pixels of the RAW image data to for example 4K (3940 horizontal pixels×2160 vertical pixels) or 8K (7880 horizontal pixels×4320 vertical pixels) or greater than this, or set the frame rate to 60 frames per second (fps), 120 fps, or greater than this.

Figure 2:
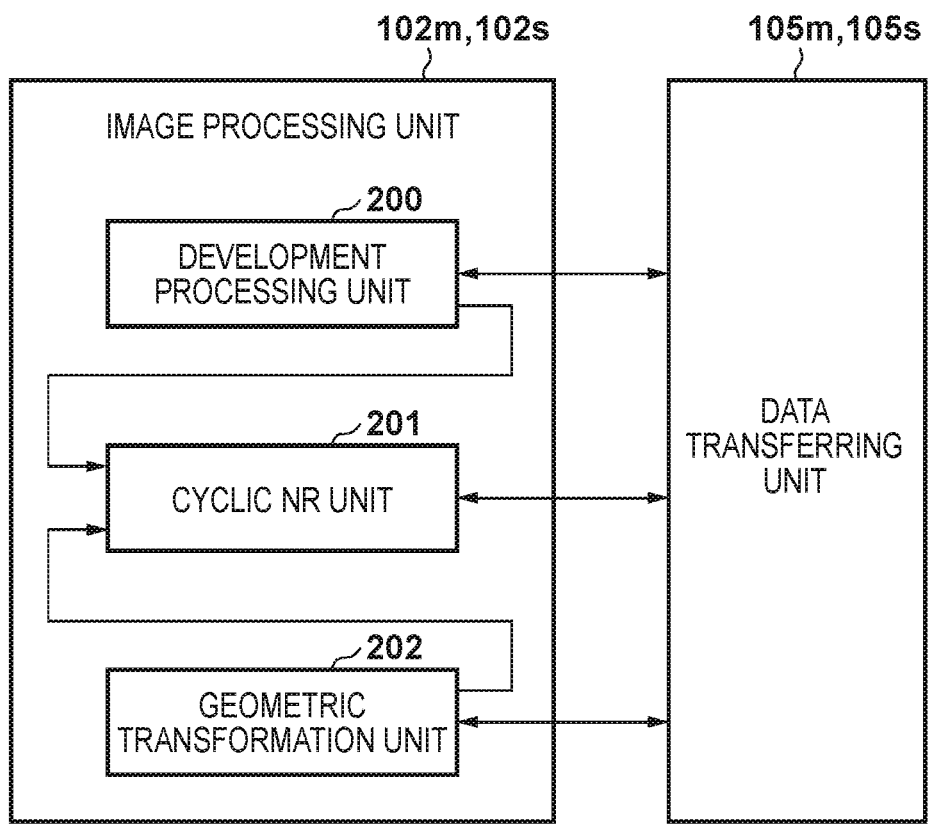
FIG. 2 is a view illustrating a connection relation between a data transferring unit and a configuration of an image processing unit and in the first embodiment.

As illustrated in FIG. 2, the image processing unit 102m is configured from a development processing unit 200, a cyclic NR (noise reduction processing) unit 201, a geometric transformation unit 202, and a plurality of other processing units (not shown) such as for correction of chromatic aberration of magnification, and resizing such as enlargement/reduction. The development processing unit 200, the cyclic NR unit 201, and the geometric transformation unit 202 temporarily store respective processing results in a memory 109m that is a work memory. The image processing unit 102m is a block for performing appropriate image processing with respect to image data. In addition, the image processing unit 102m is connected to the data transferring unit 105m.

The development processing unit 200 is connected to the data transferring unit 105m. The development processing unit 200 is input with image data via the data transferring unit 105, performs processing such as demosaic processing, gamma correction, or luminance/color generation, and outputs processed image data to the data transferring unit 105 or directly to the cyclic NR unit 201, or to both.

The cyclic NR unit 201 is connected to the data transferring unit 105m, the development processing unit 200, and the geometric transformation unit 202. The cyclic NR unit 201 is input with image data from the development processing unit 200 or the geometric transformation unit 202 and image data from the data transferring unit 105m of one frame prior that has been processed by the cyclic NR unit 201, and performs NR processing (noise reduction processing) between the frames. The cyclic NR unit 201 outputs image data after the NR processing to the data transferring unit 105m. Note that configuration may be taken to perform NR processing between frames such that, for input of image data, data for two image's worth are simultaneously input from the data transferring unit 105m.

The geometric transformation unit 202 is connected to the data transferring unit 105m. The geometric transformation unit 202m is input with image data from the data transferring unit 105m; performs processing such as a geometric-transformation processing, for example distortion correction for removing distortion of an optical lens; and outputs image data after the processing to the data transferring unit 105m or directly to the cyclic NR unit 201, or to both.

The communication unit 104m transmits image data stored in the memory 109m to the image processing circuit 117.

The data transferring unit 105m is configured by a plurality of Direct Memory Access controllers for performing data transfers such as reading and writing with respect to the memory 109m or the recording medium 111.

The system bus 106m is connected to a system controller (CPU) 114m, the decoder 101, an image processing unit 102m, a communication unit 104m, a data transferring unit 105m, a memory controller 108m, the recording medium controller 110, and a non-volatile memory controller 112. Its main purpose is as a bus that is used when control of each of the processing blocks is performed from the system controller 114m.

The data bus 107m is connected to the data transferring unit 105m, the memory controller 108m, and the recording medium controller 110. Its main purpose is as a bus that is used when reading and writing of image data or the like is performed.

The memory controller 108m writes data to the memory 109m or reads data from the memory 109m, in accordance with an instruction from the system controller 114m or the data transferring unit 105m. The memory 109m is a storage device provided with sufficient storage capacity to store a predetermined number of still images, a moving image of a predetermined duration, data such as audio, constants and programs for operation of the system controller 114m, or the like. In the present embodiment, DRAM is used as the memory 109m, by it is also possible to use another volatile memory or a non-volatile memory.

The recording medium controller 110 writes data to the recording medium 111 and reads data from the recording medium 111, in accordance with an instruction from the system controller 114*m*. The recording medium 111 is a semiconductor memory, such as a memory card, for recording compressed still images or moving image data. The recording medium 111 can be easily mounted and unmounted with respect to the image processing apparatus, in accordance with a mounting/unmounting mechanism (not shown).

The non-volatile memory controller 112*m* writes data to the non-volatile memory 113*m* and reads data from the non-volatile memory 113*m*, in accordance with an instruction from the system controller 114*m*. The non-volatile memory 113*m* is a memory that can be deleted and recorded on electronically. As the non-volatile memory 113*m*, for example an EEPROM or the like is used. Constants, programs and the like for operation of the system controller 114*m* are stored in the non-volatile memory 113*m*.

The system controller 114*m* is configured by a microcomputer or the like for controlling operation control of an image processing apparatus 1, and executes various instructions or various control processing with respect to each functional block that configures the image processing apparatus 1. The system controller 114*m* controls the decoder 101, the image processing unit 102*m*, the communication unit 104*m*, and the data transferring unit 105*m* that are connected via the system bus 106*m*. Furthermore, the system controller 114*m* also performs control of an image capture processing unit and a compression/decompression unit (not shown), the memory controller 108*m*, the recording medium controller 110, the non-volatile memory controller 112*m*, an operating unit 116, an image capture device (not shown), or the like. The CPU in the system controller 114*m* realizes the processing of the first embodiment by executing a program recorded in the non-volatile memory 113*m* that is previously described. In addition, the system controller 114*m* includes an assignment processing unit 115.

In this embodiment, each frame of the RAW image data of a moving image that has been read from the recording medium 111 is processed by the image processing circuits 100 and 117. So the assignment processing unit 115 determines partial areas of each frame of the RAW moving image data to be processed by the respective image processing circuits. Specifically, the assignment processing circuit 115 calculates a size of each partial area and a number of partial areas of the image data in each frame. A detailed explanation of the assignment processing unit 115 is described later using FIG. 4. In addition, processing may be performed by only one of the image processing circuits in accordance with a data amount of read RAW image data.

The operating unit 116 includes a button or a switch or the like that is operated by a user, and is used for operations such as ON/OFF of a power supply, ON/OFF of a shutter, or the like.

Thus ends the explanation for the image processing circuit 100. In the image processing circuit 117, that which has the same reference numeral essentially has the same function as a corresponding processing unit in the image processing circuit 100. Accordingly, explanation is given below of points in the image processing circuit 117 that are different from the image processing circuit 100, and points where attention should be given.

The image processing unit 102*s* has the configuration of FIG. 2 similarly to the image processing unit 102*m*, and is connected to the data transferring unit 105*s*. The communication unit 104*s* receives image data transferred from the image processing circuit 100, and supplies it to the data transferring unit 105*s*. The data transferring unit 105*s* performs a transfer of image data received via the communication unit 104*s* to any of the memory 109*s*, the image processing unit 102*s*, or the display controller 103. In addition, the data transferring unit 105*s* performs data transfer with the memory 109*s*, the image processing unit 102*s*, and the display controller 103. The display controller 103 outputs image data stored in the memory 109*s* and the memory 109*m* to a display unit 118, and displays it as a moving image.

The system controller 114*s* is configured by a microcomputer or the like, and executes various instructions or various control processing with respect to each functional block in the image processing circuit 117. The system controller 114*s* controls the image processing unit 102*s*, the communication unit 104*s*, the data transferring unit 105*s*, the memory controller 108*s*, and the non-volatile memory controller 112*s* that are connected via the system bus 106*s*. The CPU in the system controller 114*s* realizes the processing of the image processing circuit 117 by executing a program recorded in the non-volatile memory 113*s* that is previously described.

Next, explanation is given for processing for reproducing encoded RAW moving image data in the embodiment. A reproduction instruction is assumed to be performed by a user from the operating unit 116.

Figure 3:
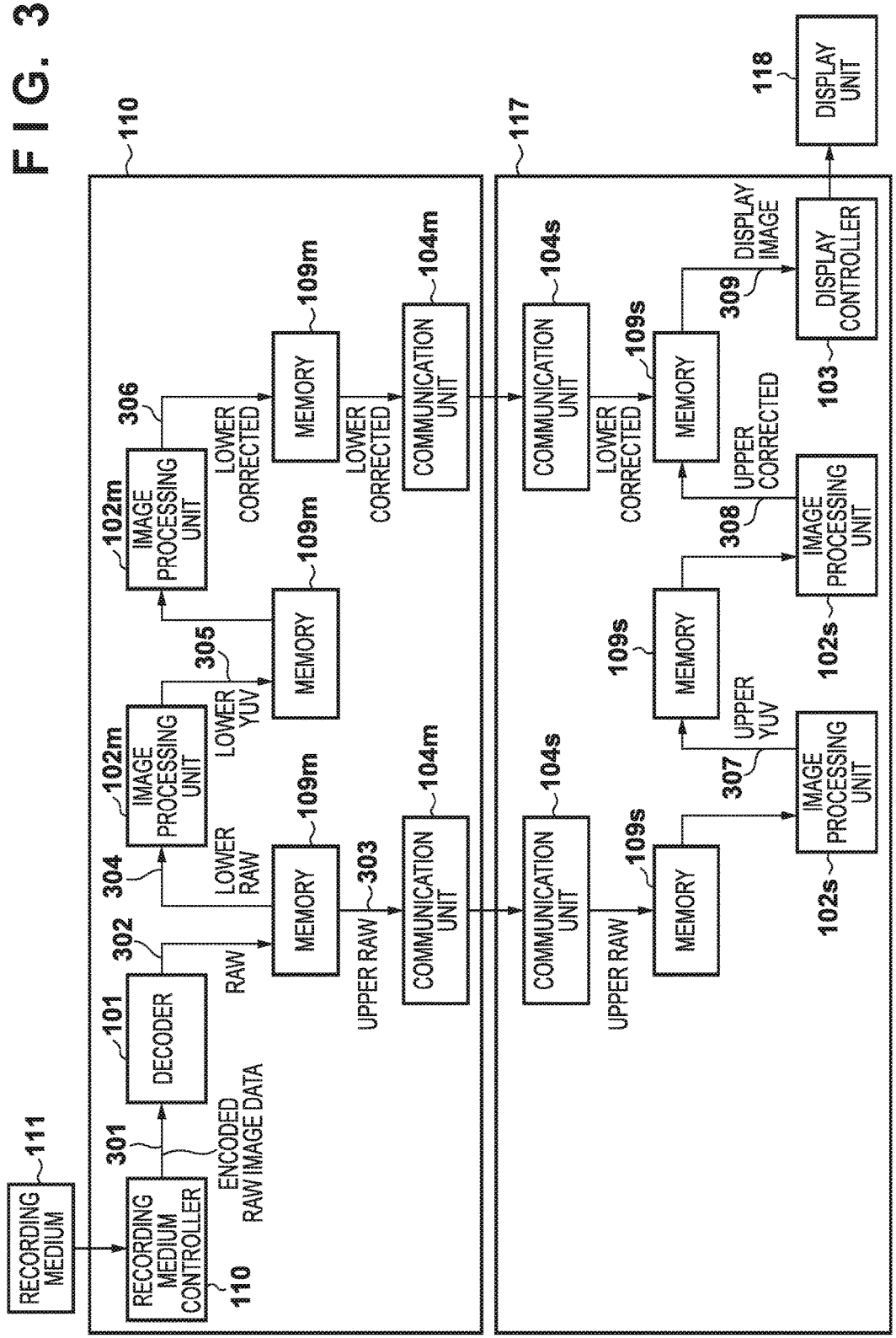
FIG. 3 is a view illustrating a flow of data in the first embodiment.

FIG. 3 is a view that illustrates a flow of data when reproducing encoded RAW moving image data in the embodiment.

Upon receiving a reproduction instruction for encoded RAW moving image data in accordance with an operation of the operating unit 116, the system controller 114*m* controls the recording medium controller 110, the data transferring unit 105*m*, and the decoder 101. As a result, the recording medium controller 110 reads encoded RAW moving image data 301 from the recording medium 111, and sends it to the decoder 101 via the data transferring unit 105*m*. The decoder 101 performs decompression (decoding) processing with respect to each frame of the encoded RAW moving image data 301 to generate RAW data 302 for each frame after the decompression. And the generated RAW data is stored to the memory 109*m* via the data transferring unit 105*m* and the memory controller 108*m*. Note that this processing repeats until there is a stop instruction from the system controller 114*m*. The recording medium controller 110, the data transferring unit 105*m*, and the decoder 101 repeat the aforementioned processing until there is a stop instruction from the system controller 114*m*.

Next, to cause partial areas of the RAW data 302 after the decompression to be processed by each of the image processing circuits 100 and 117, the assignment processing unit 115 of the system controller 114*m* determines as partial areas upper and lower areas of one frame of the RAW image data 301. The upper and lower areas have an area that overlaps therebetween. Specifically, when one frame of RAW image data is configured by N lines, it is determined that the upper area is configured by the first line to the Mth line of one frame, and the lower area is configured by the M-Lth line to the Nth line of one frame. Here, a width L by which the RAW image data of the upper area (upper RAW image data) and the RAW image data of the lower area (lower RAW image data) overlap depends on a maximum size of a pixel used in filtering processing used by the development processing unit 200, the cyclic NR unit 201, and the geometric transformation unit 202 in the image processing units 102*m* and 102*s*. For example, if pixels used in filtering processing used by the cyclic NR unit 201 are 9 horizontal pixels×9 vertical pixels, a range of 4 pixels up, down, left and right from the position of a pixel of interest as a center is used to perform filtering processing. Consequently, L=4. The assignment processing unit 115 determines the value of M. Note that, in the embodiment, explanation is given by an example of determining partial areas as upper and lower areas of one frame as described above, but partial areas may be determined as left and right areas while reserving an area that overlaps therebetween.

In the embodiment, the image processing circuit 100 processes lower RAW image data, and the image processing circuit 117 processes upper RAW image data.

Therefore, lower RAW image data 304 in the RAW image data stored in the memory 109m is supplied to the image processing unit 102m via the data transferring unit 105m. The development processing unit 200 of the image processing unit 102m receives this lower RAW image data, performs development processing (including demosaic processing), and generates lower YUV image data that expresses a YUV color space. The lower YUV image data is temporarily stored in the memory 109m via the data transferring unit 105m and the memory controller 108m. The lower YUV image data of the current frame and the lower YUV image data of the previous frame are supplied to the image processing unit 102m, via the memory controller 108m and the data transferring unit 105m. The geometric transformation unit 202 of the image processing unit 102m performs geometric-transformation processing for the lower YUV image data of the current frame as necessary. In addition, the cyclic NR unit 201 of the image processing unit 102m performs NR processing between frames, based on the lower YUV image data of the current frame and the lower YUV image data of the previous frame. Image data after this geometric transformation and NR processing, is stored to the memory 109m as corrected image data, via the data transferring unit 105m and the memory controller 108m. The lower corrected image data is then transferred to the image processing circuit 117, via the memory controller 108m, the data transferring unit 105m, and the communication unit 104m.

Meanwhile, upper RAW image data 303 in the RAW image data stored in the memory 109m is transferred to the image processing circuit 117 via the data transferring unit 105m and the communication unit 104m.

The communication unit 104s in the image processing circuit 117, under control by the system controller 114s, receives the upper RAW image data that is transferred from the communication unit 104m. The communication unit 104s temporarily stored the received upper RAW image data in the memory 109s, via the data transferring unit 105s and the memory controller 108s. The upper RAW image data is then supplied to the image processing unit 102s via the memory controller 108s and the data transferring unit 105s. Development processing is performed on the upper RAW image data in the image processing unit 102s, and upper YUV image data 307 is generated. The generated upper YUV image data 307 is temporarily stored in the memory 109s, via the data transferring unit 105s and the memory controller 108s. The upper YUV image data of the current frame and the upper YUV image data of the previous frame are supplied to the image processing unit 102s, via the memory controller 108s and the data transferring unit 105s. The geometric transformation unit 202 of the image processing unit 102s performs geometric-transformation processing for the upper YUV image data of the current frame as necessary. In addition, the cyclic NR unit 201 of the image processing unit 102s performs NR processing between frames, based on the upper YUV image data of the current frame and the upper YUV image data of the previous frame. Image data after this geometric transformation and NR processing, is stored to the memory 109s as corrected image data, via the data transferring unit 105s and the memory controller 108s. At this point, the lower corrected image data of the same frame that has been transferred from the image processing circuit 100 is stored in the memory 109s. In other words, one frame of corrected image data is stored in the memory 109s. Therefore, the display controller 103, via the memory controller 108s and the data transferring unit 105s, obtains one frame's worth of image data after correction that is stored in the memory 109s, and outputs it to the display unit 118 to display it.

Next, explanation is given for partial area determination processing by the assignment processing unit 115 in the system controller 114m of the image processing circuit 100.

As described above, the assignment processing unit 115 determines a size of a partial area that the image processing circuits 100 and 117 will respectively process, for each frame of the RAW image data after the decoding. In other words, the assignment processing unit 115 determines the "M" explained earlier.

In the present embodiment, partial areas that the image processing circuits 100 and 117 will respectively process are determined so that a number of pixels that the image processing circuit 100 will process is smaller by a predetermined number of pixels that the number of pixels that the image processing circuit 117 will process.

For example, upper and lower portions of one frame is determined for processing each portion by the image processing circuits 100 and 117, a lower portion is processed by the image processing circuit 100, and an upper portion is processed by the image processing circuit 117. In such a case, a vertical number of pixels (a number of lines) of the upper portion to be processed by the image processing circuit 100 is set to be n pixels (n lines) smaller than the lower portion to be processed by the image processing circuit 117.

In addition, in a case of left and right portions of one frame is determined for processing each portion by the image processing circuits 100 and 117, a left side portion is processed by the image processing circuit 100, and a right side portion is processed by the image processing circuit 117, a number of horizontal pixels of the portion to be processed by the image processing circuit 100 is set to be m pixels smaller than that to be processed by the image processing circuit 117.

A reason to configure as described above is as follows. The decoder 101 is mounted on the image processing circuit 100, and the decoder 101 accesses the memory 109m. Meanwhile, the image processing circuit 117 does not have a decoder, and does not perform decoding processing. Therefore, a data amount that the image processing circuit 100 performs reading/writing per unit time with respect to the memory 109m is larger than a data amount that the image processing circuit 117 performs reading/writing per unit time with respect to the memory 109s by an amount by which the decoder 101 accesses the memory 109m. Accordingly, in a case of assigning partial areas in one frame equally and respectively performing processing by image processing units 102 on the master side and the slave side, there is the possibility that the master side will consume its memory bandwidth, and it will cease to be possible to generate one normal frame.

Considering this, in the case of the present embodiment, a number of pixels in RAW image data assigned for the image processing circuit 100 that functions as a master is made to be smaller than a number of pixels assigned for the image processing circuit 117 processes by a predetermined number of pixels. As a result, a data amount that the image processing unit 102m of the image processing circuit 100 performs reading/writing with respect to the memory 109m becomes smaller than a data amount that the image processing unit 102s of the image processing circuit 117 performs reading/writing with respect to the memory 109s. Therefore, it is possible to suppress occurrence of a loss for a moving image due to a bandwidth for memory access in the image processing circuit 100 of the master side being insufficient.

Note that, in the present embodiment, it is assumed that a frame rate and a number of pixels for one frame of RAW image data to be reproduced are determined in advance. Therefore, configuration is such that numbers of pixels processed by the image processing circuits 100 and 117 are decided in advance so that the bandwidth of the memory access in the master side image processing circuit 100 is not insufficient.

Next, explanation is given regarding processing in a case where a frame rate and the size (a number of pixels in the horizontal or vertical direction) of one frame of RAW image data to be reproduced from the recording medium 111 have not been decided. For example, this is easy to understand if consideration is given to a case in which an imaging apparatus that applies the present embodiment has a plurality of resolution modes, or a case in which the recording medium 111 is used by another imaging apparatus and RAW moving image data captured by the other imaging apparatus is stored in the recording medium 111.

In these cases, portions in one frame of RAW image data respectively processed by the image processing circuits 100 and 117 are decided in accordance with a frame rate and a number of pixels of RAW image data to be reproduced.

Figure 4:
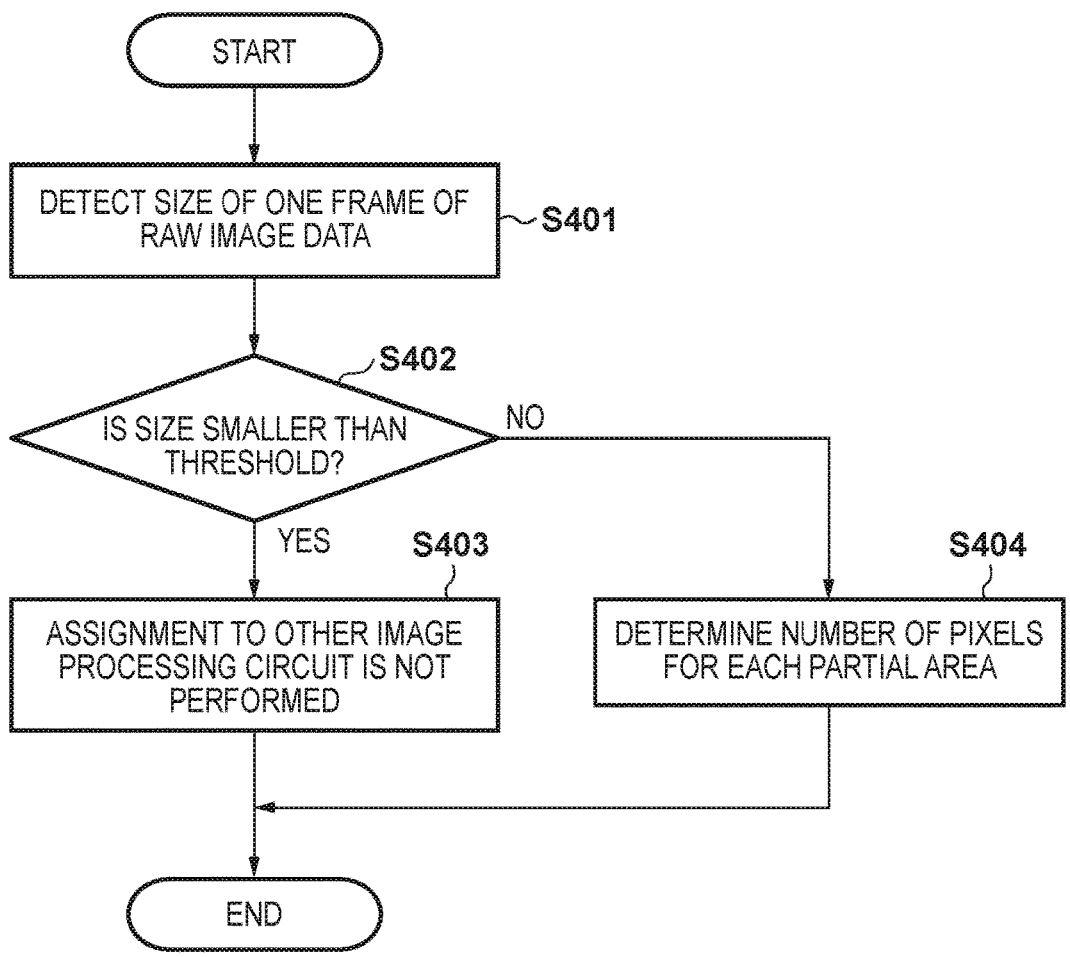
FIG. 4 is a flowchart illustrating a process for determining division in the first embodiment.

FIG. 4 is a flowchart for explaining determination processing of partial areas by the assignment processing unit 115 in the system controller 114m of the image processing circuit 100. The assignment processing unit 115 detects the size of one frame from additional information such as a header of the RAW image data to be reproduced (step S401). Next, the assignment processing unit 115 determines whether the detected size is smaller than a threshold (step S402). If the size is smaller than the threshold, it is possible to process the RAW image data to be reproduced without generating a loss of a frame, by only the image processing circuit 100 and without using the image processing circuit 117. Accordingly, if it is determined that the size of one frame of RAW image data to be reproduced is smaller than the threshold, the assignment processing unit 115 does not perform assignment of RAW image data to other image processing circuit (image processing circuit 117) and the processing ends (step S403). If the size of one frame is greater than or equal to the threshold, a size (number of pixels) of each partial area to be processed by each image processing circuit is determined (step S404).

In step S403, the system controller 114m sends all pixels for one frame to the image processing unit 102m without sending the RAW image data for each frame decoded by the decoder to the image processing circuit 117. In addition, the system controller 114m notifies the system controller 114s, via the communication unit 104m, that processing will be performed without assigning a portion in each frame. The image processing unit 102m performs processing of all pixels of one frame, generates corrected image data for each frame, and stores it in the memory 109m via the data transferring unit 105m. The system controller 114m controls the data transferring unit 105m and sends corrected image data for each frame stored in the memory 109m to the image processing circuit 117 in accordance with the communication unit 104m. The communication unit 104s of the image processing circuit 117 receives the corrected image data for each frame, and temporarily stores it in the memory 109s in accordance with the data transferring unit 105s. The system controller 114s reads the corrected image data for each frame from the memory 109s, and sends it to the display unit 118 via the display controller 103.

Note that, in step S402, if it is determined that the size of one frame is smaller than the threshold, configuration may be taken to send each frame from the decoder 101 to the image processing circuit 117, and display on the display unit 118 after performing processing by the image processing unit 102s of the image processing circuit 117.

Here, to perform processing upper and lower areas in one frame, a size for processing by the master side image processing circuit 100 is obtained as number of horizontal pixels×((number of vertical lines/2−R)+L).

The size to be processed by the slave side image processing circuit 117 is obtained as number of horizontal pixels×((number of vertical lines/2+R)+L).

Here R is a value for determining a number of pixels (a number of lines) of each partial area, and L is a value (known beforehand) that depends on a maximum size of a filter used by the image processing units 102m and 102s.

Note that, in a case of processing left and right areas in one frame, a size for processing by the master side (the image processing circuit 100) is obtained as ((number of horizontal pixels−R)+L)×number of vertical lines/2 and the size to be processed by the slave side (the image processing circuit 117) is obtained as ((number of horizontal pixels+R)+L)×number of vertical lines/2

Note that whether to process upper and lower areas or left and right areas may be determined in advance, or may be changed after the system controller 114 determines an orientation of an apparatus at a time of capturing of RAW image data to be reproduced.

Figure 5:
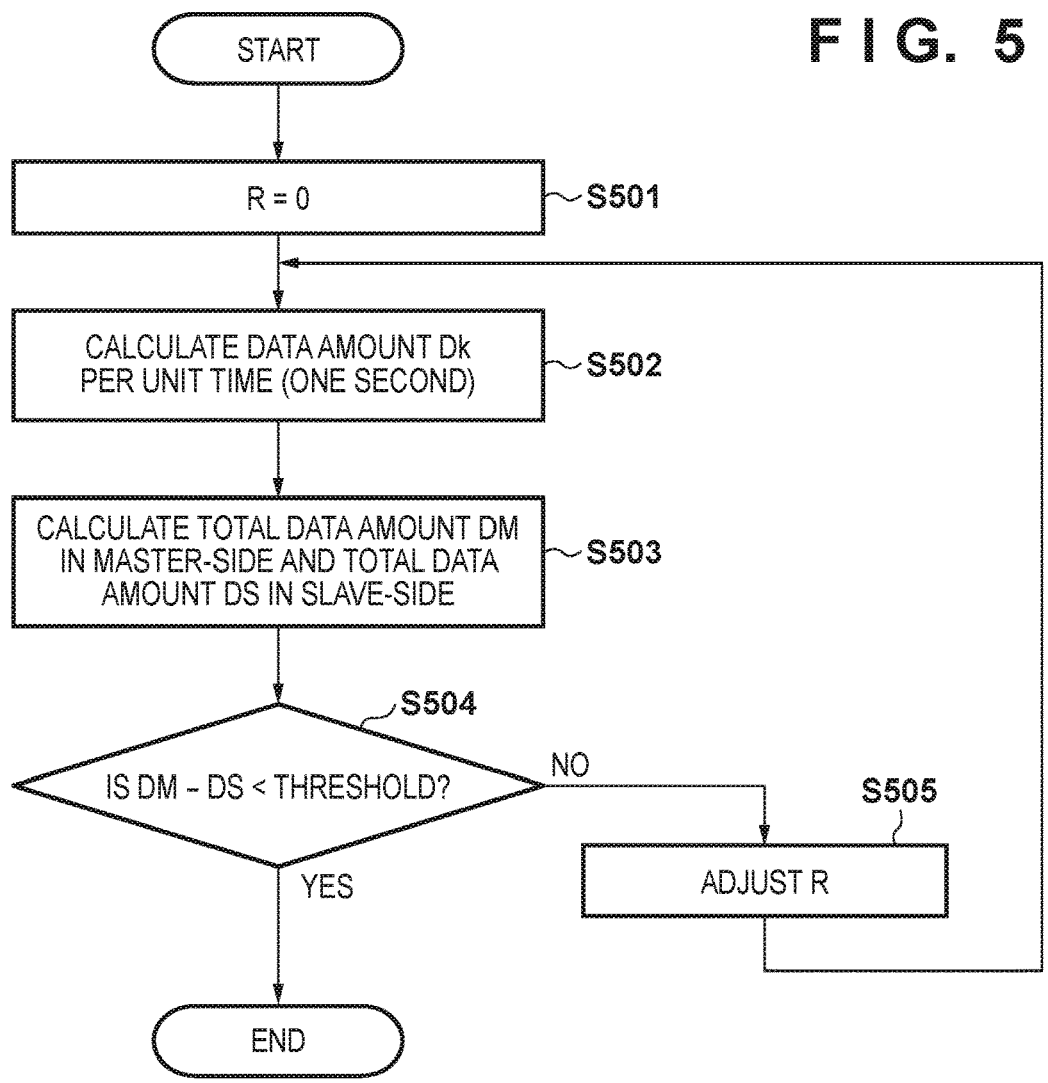
FIG. 5 is a flowchart illustrating processing for determining an area size in the first embodiment.

Next, the flowchart of FIG. 5 is used to give an explanation regarding a process for calculating the aforementioned "R" for when the number of pixels after the assignment (partial area size) is determined. The processing of FIG. 5 is also performed by the assignment processing unit 115.

Firstly, the assignment processing unit 115 initializes a variable R by "0" (step S501). Next, the assignment processing unit 115 calculates by the following Equation (1) a data amount Dk (units of bytes) in processes per unit time (one second) (step S502).

Dk=number of pixels accessed in the memories 109m and 109s per 1 unit of processing×number of bits for one pixel/8×frame rate  (1)

Here k means a suffix of an amount of simultaneous reading/writing to the memory 109 per unit time (1 second), and a case of k=4 means that there are a total of 4 processes of reading or writing with respect to the memory 109. For example, it means that the total of accesses to the memory 109 was 4 processes: 2 generated by a read and write with respect to the memory 109 for the development processing unit 200 to perform processing, and 2 generated by a read and a write with respect to the memory 109 for the geometric transformation unit 202 to perform processing.

Next, the assignment processing unit 115 calculates by Equation (2) a total data amount DM with respect to the memory 109*m* of the image processing circuit 100, and calculates by Equation (3) a total data amount DS with respect to the memory 109*s* of the image processing circuit 117 (step S503).

Additionally, because the decoder 101 is present in the image processing circuit 100, please note the point that there are more processing units that perform reading/writing with respect to the memory 109*m* than for the image processing circuit 117.

$$DM=D1+D2+\ldots+Dk \quad (2)$$

$$DS=D1+D2+\ldots+Dk \quad (3)$$

Next, the assignment processing unit 115 distinguishes whether a value obtained by subtracting DS from DM is smaller than a threshold (step S504). If the value obtained by subtracting DS from DM is smaller than a threshold, the assignment processing unit 115 holds the value of the variable R at that point and the processing ends. In addition, if a value obtained by subtracting DS from DM is not smaller than the threshold, the assignment processing unit 115 adjusts the value of the variable R and returns the processing to step S502 (step S505). For example, in a case of processing RAW image data of upper and lower areas, in step S505 the assignment processing unit 115 adds 10 that indicates 10 lines to the variable R. In addition, in a case of processing RAW image data of left and right areas, the assignment processing unit 115, in step S505, adds 20, indicating a number of additional pixels 20, to the variable R.

In addition, as another calculation method, c may be calculated by the following simultaneous equations.

((number of pixels of process 1−*c*)×bit/pix/8×*f*)+((a processing number of pixels of process 2−*c*)× bit/pix/8×*f*)+ . . . +processing data amount of RAW decoder=((processing number of pixels of process 1+*c*)×bit/pix/8×*f*)+((processing number of pixels of process 2+*c*)×bit/pix/8×*f*)

Here, process 1, process 2, . . . indicate units of processes that are processed by an image processing unit, and for example the process 1 indicates processing performed by the development processing unit 200 and the process 2 indicates processing performed by the cyclic NR unit 201. The bit/pix means a number of bits of one pixel of image data that is to be processed. The f means a frame rate. Because c is a an adjustment numbers of pixels with respect to a number of pixels processed for each process, at a time of processing upper and lower areas, a value obtained by dividing the value of c by the number of horizontal pixels (rounding up or rounding down after the decimal point) is set to R, and at a time of processing left and right areas, a value obtained by dividing the value of c by the number of vertical lines (rounding up or rounding down after the decimal point) is set to R.

Explanation was given above regarding assignment processing, but a method different to the present embodiment may be used to the extent that it does not deviate.

As explained above, by virtue of the present embodiment, portions for processing by each processing circuit are determined so that a data amount for processing by a slave side and a master side are equal. Therefore, bus bandwidths become equal, and it is possible to prevent a loss of a screen to be displayed. In addition, by processing partial areas in one frame of the RAW image data by the plural image processing circuits, NR processing that uses image data for two successive frames becomes possible, and it is possible to effectively reduce noise.

Specific explanation based on the first embodiment was given above, but the present invention is not limited to the embodiment described above, and it goes without saying that various changes are possible in an scope that does not deviate from the gist of the present invention.

In addition, if an area that overlaps in a vertical direction for upper and lower areas is unnecessary in filtering processing by the image processing units 102, the partial areas to be processed by each processing circuit are determined so that a data amount processed by the slave side and the master side become equal, in accordance with the present embodiment, so that an overlapping area is not included.

Second Embodiment

Next, a second embodiment of the present invention is described. Note that explanation is given here only for portions different to the first embodiment described previously, and for portions that are the same, for example the same reference numerals are added and a detailed explanation is omitted.

Figure 6:
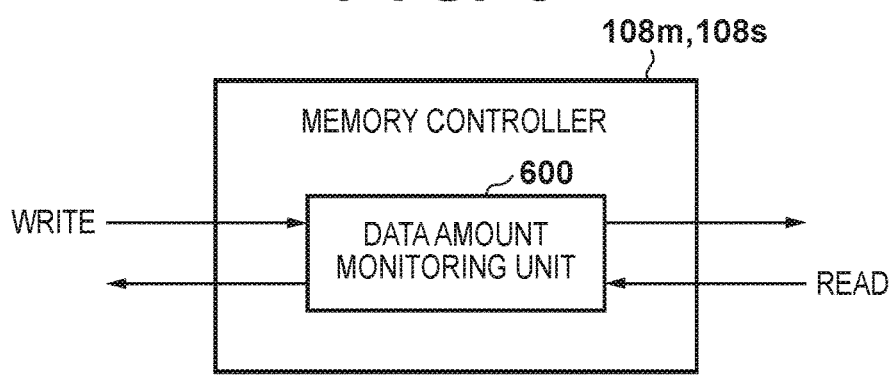
FIG. 6 is a block diagram of a memory controller in a second embodiment.

FIG. 6 is a block configuration diagram of the memory controller 108*m*. As illustrated by the same figure, the memory controller 108*m* includes a data amount monitoring unit 600. The data amount monitoring unit 600 has a function of monitoring a data amount for reads and writes with respect to the memory 109*m*, and holding the data amount for a fixed interval. The memory controller 108*s* in the image processing circuit 117, similarly to FIG. 6, has a data amount monitoring unit for monitoring a data amount of reading and writing with respect to the memory 109*s*.

Figure 7:
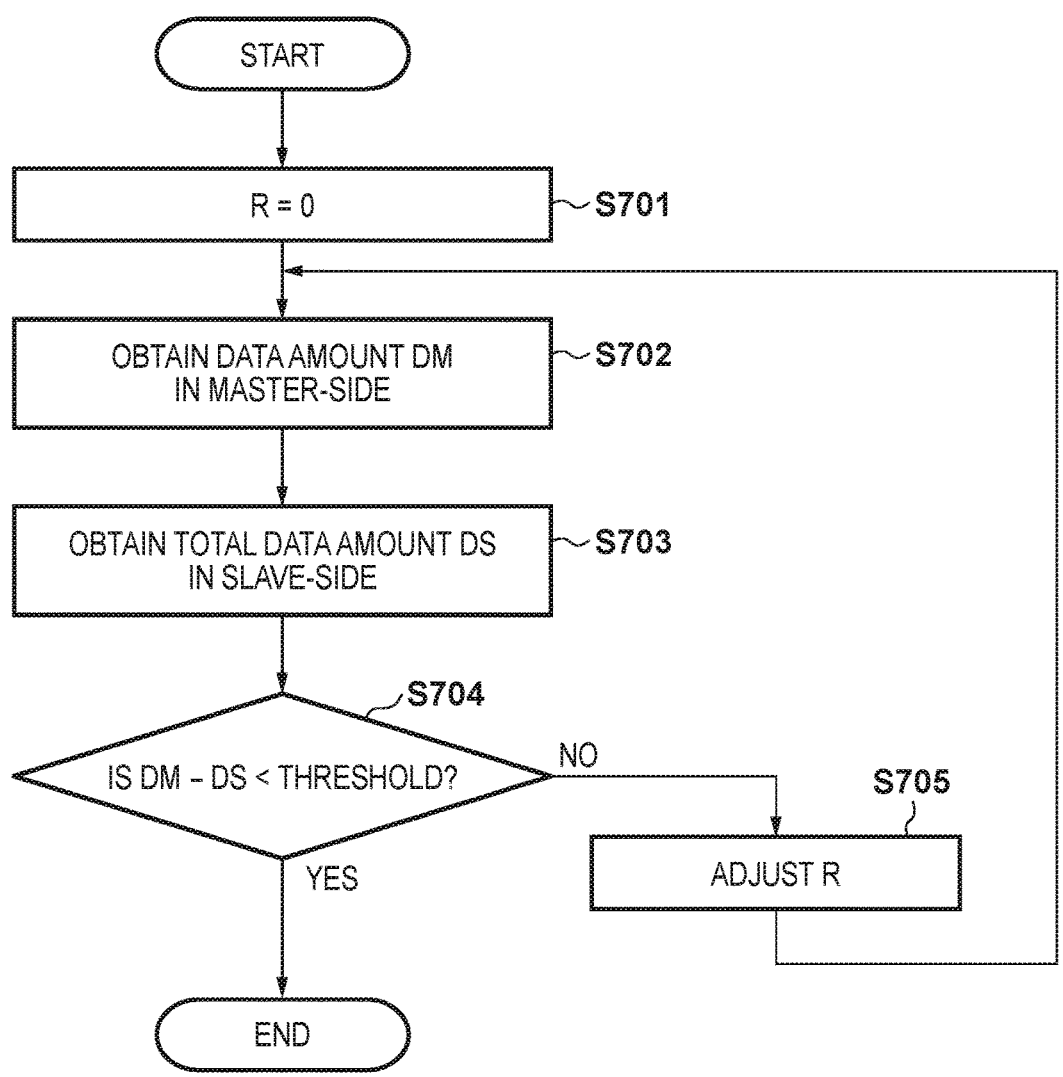
FIG. 7 is a flowchart illustrating processing for determining an area size in the second embodiment.

Assignment processing of the assignment processing unit 115 in the second embodiment is the same as the flow diagram illustrated in FIG. 4, so explanation thereof is omitted. The flowchart of FIG. 7 is used to give an explanation below regarding a process for calculating the aforementioned "R" for determining the number of pixels of each partial area in one frame.

Firstly, the assignment processing unit 115 sets the variable R with an initial value of "0" (step S701). The assignment processing unit 115 obtains the data amount DM by the data amount monitoring unit 600 of the image processing circuit 100 which is the master side (step S702). In addition, the assignment processing unit 115 obtains the data amount DS of the slave-side image processing circuit 117 by making a request to the system controller 114*s* via the communication unit 104*m* so as to obtain the data amount DS by the data amount monitoring unit 600 of the slave-side image processing circuit 117 (step S703).

Next, the assignment processing unit 115 distinguishes whether the value obtained by subtracting DS from DM is smaller than a threshold (step S704). If the value obtained by subtracting DS from DM is smaller than a threshold, the assignment processing unit 115 holds the variable R at that point and the processing ends. In addition, if the value obtained by subtracting DS from DM is not smaller than the threshold, the assignment processing unit 115 adjusts the variable R and the processing returns to step S702. This adjustment may be the same as that in the first embodiment.

Note that, in the second embodiment, the assignment processing unit 115 determines a size of each partial area to be equal for the first frame of RAW moving image data to be reproduced after the start of reproduction. In other words, in a case of processing the RAW image data of upper and lower areas in one frame, the assignment processing unit 115 determines so that the size of the upper RAW image data and the lower RAW image data of the first frame are the same size. The processing of FIG. 7 is executed for the first frame, and R is determined after detecting a data amount of reading/writing with respect to the memory that each image processing circuit has at the time of the assignment. It is assumed that, for second and subsequent frames, the size of each partial area is determined in accordance with the determined variable R, and then distributed processing by the image processing circuits 100 and 117 is performed. Note that configuration may be taken to not display the first frame, determine R, and subsequently perform processing for reproducing from the first frame.

Other Embodiments

In the first and second embodiments described above, explanation was given of examples in which the number of image processing circuits was two. However, there is no particular restriction on that number of it is a plurality of two or more. For example, assume that there are n (n≥2) image processing circuits $C_1, C_2, \ldots, C_n$ for reproducing the RAW moving image data. It is assumed that the image processing circuit $C_1$ has a RAW moving image decoder. In this case, the image processing circuit $C_1$ has more access to memory than the other image processing circuits $C_2$ to $C_n$, by the decoder. Accordingly, a portion for more access to the memory connected to the image processing circuit $C_1$ may be distributed to the image processing circuits $C_2$ to $C_n$. In other words, the size of a target area in a frame that is subject to the image processing unit of the image processing circuit $C_1$ is set to be smaller than for the other image processing circuits $C_2$ to $C_n$.

For example, a case in which the first embodiment is applied and n partial areas in an upward/downward orientation are processed by n image processing circuit is examined. In such a case, a partial area that the image processing circuit $C_1$ that functions as the master processes can be defined as number of horizontal pixels×((number of vertical lines/$n-R$)+$L$)

Meanwhile, a partial area that each of the non-master slave image processing circuits $C_2$ to $C_{n-1}$ processes can be defined as number of horizontal pixels×((number of vertical lines/$n+R$)+$2\times L$)

The partial area that the last image processing circuit $C_n$ processes can be defined as number of horizontal pixels×((number of vertical lines/$n+R/n$)+$L$)

The reason why "2×L" is included in size of the areas that the image processing circuits $C_2$ to $C_{n-1}$ process is because overlap areas for filtering processing are present on both of an upper end and a lower end of each of these areas. If the number of image processing circuits is sufficiently large, $C_2$ to $C_n$ may be deemed to be the same size.

In addition, the present invention is also realized by executing the following processing. In other words, software (a program) for realizing the processing of the system controllers 114m and 114s in the embodiments described above is supplied to a system or an apparatus via a network or various storage mediums. It is processing in which a computer (or CPU or MPU or the like) of the system or apparatus reads the program and executes it.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-075423, filed Apr. 4, 2016, which is hereby incorporated by reference herein in its entirety.

What is claimed is:
1. An image processing apparatus comprising:
a plurality of image processing circuits; and
a plurality of memories respectively connected to the plurality of image processing circuits,
wherein each of the plurality of image processing circuits performs image processing that includes development processing of RAW moving image data using a memory connected to the image processing circuit, and comprises a communication unit,
wherein a first image processing circuit that is one of the plurality of image processing circuits comprises at least one processor and/or at least one circuit to perform the following operations:
(a) decoding encoded RAW moving image data and storing the decoded RAW moving image data in a memory connected to the first image processing circuit,
(b) determining partial areas, in one frame of the decoded RAW moving image data, to be processed by respective image processing circuits of the plurality of image processing circuits so that the plurality of image processing circuits respectively process the partial areas in the one frame of the decoded RAW moving image data, the partial areas including (1) a first partial area to be processed by the first image processing circuit and (2) a second partial area to be processed by a second image processing circuit of the plurality of image processing circuits other than the first image processing circuit, wherein a size of the first partial area to be processed by the first image processing circuit is smaller than a size of the second partial area to be processed by the second image processing circuit, (c) performing the image processing to the first partial area of the one frame of the decoded RAW moving image data, and (d) transmitting, by the communication unit of the first image processing circuit, the second partial area of the one frame of the decoded RAW moving image data to the second image processing circuit which performs the image processing to the second partial area of the one frame of the decoded RAW moving image data.

2. The apparatus according to claim 1, wherein the size of the first partial area is smaller by a predetermined number of pixels than the size of the second partial area.

3. The apparatus according to claim 1, wherein the image processing includes development processing, noise reduction processing, and geometric-transformation processing.

4. The apparatus according to claim 3, wherein the noise reduction processing is processing that uses image data of a plurality of frames.

5. The apparatus according to claim 1, wherein the at least one processor and/or the at least one circuit perform further operations comprising:

obtaining a first data amount read from or written into the memory connected to the first image processing circuit in a unit time by the first image processing circuit, and a second data amount read from or written into the memories connected to other image processing circuits of the plurality of image processing circuits in a unit time by the other image processing circuits, and wherein in the determining, the at least one processor and/or the at least one circuit perform determining the size of the partial areas to be processed by each image processing circuit based on the obtained first data amount and the obtained second data amount.

6. The apparatus according to claim 1, wherein each of the image processing circuits comprises a monitoring unit configured to monitor a data amount read or written per unit time with respect to the memory connected to the image processing circuit, and wherein, in the determining, the at least one processor and/or at least one circuit perform determining the size of the partial areas to be processed by each image processing circuit based on the data amount detected by the monitoring unit of the first image processing circuit and the data amount received by the communication unit of the first image processing circuit.

7. The apparatus according to claim 1, wherein the second image processing circuit of the plurality of image processing circuits comprises a display controller configured to output an image to a display apparatus, and wherein the display controller obtains image data of one frame displayed by the display apparatus from image data processed by the second image processing circuit and image data, received by the communication unit of the second image processing circuit, of partial areas processed by image processing circuits other than the second image processing circuit, and outputs the obtained image data to the display apparatus.

8. The apparatus according to claim 1, wherein each of the plurality of image processing circuits further comprises a memory controller configured to control transfer of data to the memory, an image processing unit, a processor for controlling the communication unit, and a non-volatile memory storing a program that the processor executes.

9. The apparatus according to claim 1, wherein the plurality of image processing circuits are each configured by one semiconductor integrated circuit.

10. The apparatus according to claim 1, wherein the image processing apparatus is implemented in an imaging apparatus.

11. The apparatus according to claim 1, wherein the at least one processor and/or the at least one circuit perform further operations comprising:

transmitting, by the communication unit of the first image processing circuit, the first partial area of the one frame of the decoded RAW moving image data having been processed by the performing the image processing, to at least one other image processing circuit of the plurality of image processing circuits which performs the image processing to partial areas of the one frame of the decoded RAW moving image data other than the first partial area.

12. An image processing apparatus comprising:
a first image processing circuit;
a first memory connected to the first image processing circuit;
a second image processing circuit; and
a second memory connected to the second image processing circuit,
wherein the first image processing circuit comprises a first communication unit configured to perform communication with the second image processing circuit, and at least one processor and/or at least one circuit to perform the operation of the following units:

(a) a decoding unit configured to decode encoded RAW moving image data and store the decoded RAW moving image data in the first memory, (b) a determination unit configured to determine (i) a first area of one frame of the decoded RAW moving image data to be processed by the first image processing circuit and (ii) a second area of the one frame of the decoded RAW moving image data to be processed by the second image processing circuit, the second area having a number of pixels greater than that of the first area, (c) a first image processing unit configured to perform, on the first area of the one frame of the decoded RAW moving image data, predetermined image processing that includes development processing of the one frame of the decoded RAW moving image data using the first memory, and to generate first moving image data, and (d) a transmission unit configured to transmit the second area of the one frame of the decoded RAW moving image data to the second image processing circuit by the first communication unit, and to transmit the first moving image data to the second image processing circuit, wherein the second image processing circuit comprises (i) a second communication unit configured to perform communication with the first image processing circuit, (ii) a display controller configured to output moving image data to a display apparatus, and (iii) at least one processor and/or at least one circuit to perform the operation of the following unit: a second image processing unit configured to perform the predetermined image processing, using the second memory, on the second area of the one frame of the decoded RAW moving image data that is transmitted from the first image processing circuit and received by the second communication unit, and to generate second moving image data, wherein the display controller generates each frame of moving image data to be displayed by the display apparatus using the first moving image data and the second moving image data, and outputs, to the display apparatus, each frame of the generated moving image data.

13. The apparatus according to claim 12, wherein the image processing apparatus is implemented in an imaging apparatus.

* * * * *